No. 772,509. PATENTED OCT. 18, 1904.
G. H. HARVEY.
GLASS DRAWING MACHINE.
APPLICATION FILED JAN. 11, 1904.
NO MODEL.
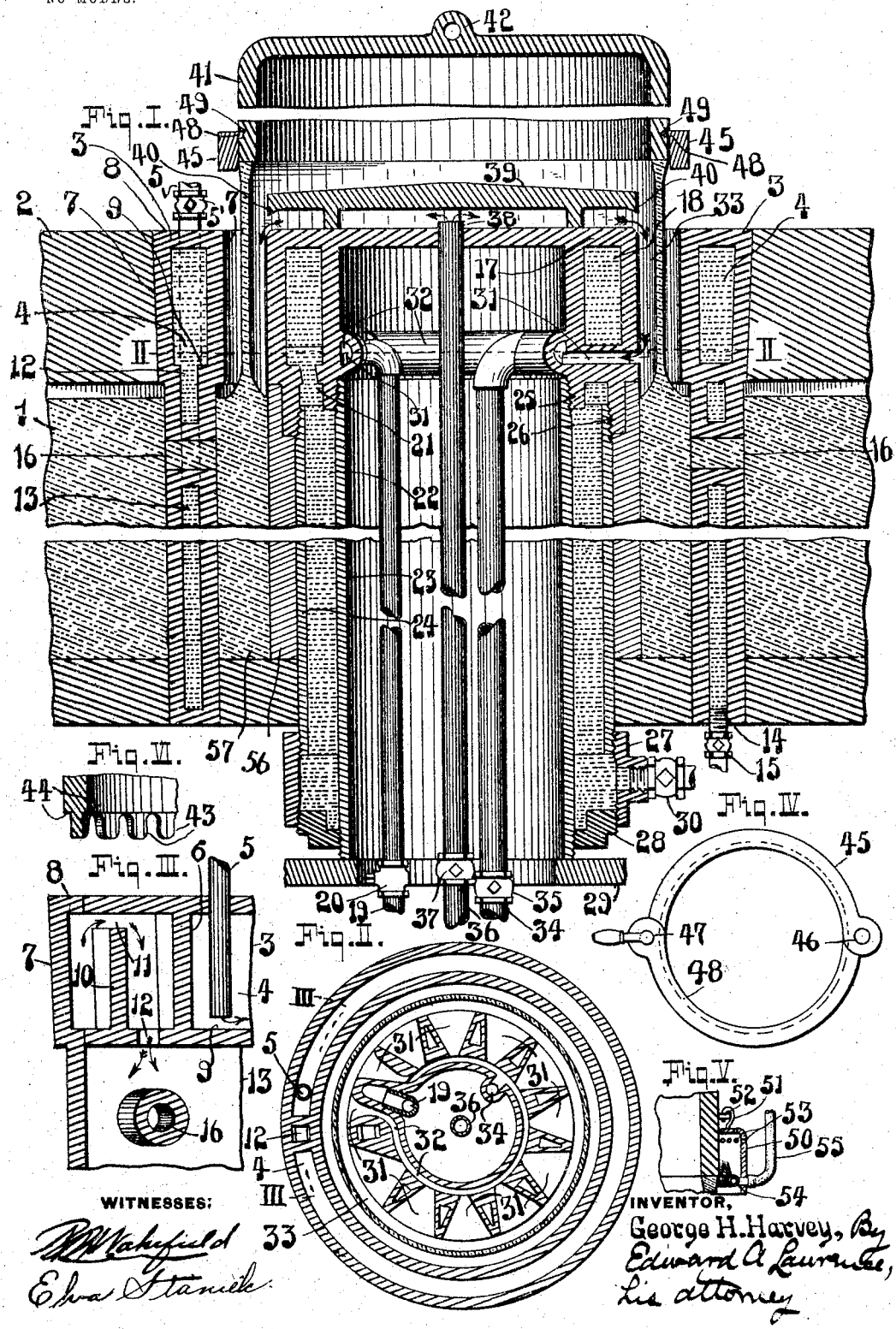
WITNESSES:
INVENTOR,
George H. Harvey, By
Edward A. Laurente,
his attorney No. 772,509.

Patented October 18, 1904.

UNITED STATES PATENT OFFICE.

GEORGE H. HARVEY, OF GLENFIELD, PENNSYLVANIA.

GLASS-DRAWING MACHINE.

SPECIFICATION forming part of Letters Patent No. 772,509, dated October 18, 1904.

Application filed January 11, 1904. Serial No. 188,501. (No model.)

*To all whom it may concern:*

Be it known that I, GEORGE H. HARVEY, a citizen of the United States, residing in Glenfield borough, in the county of Allegheny and State of Pennsylvania, have invented or discovered new and useful Improvements in Glass-Drawing Machines, of which the following is a specification.

In the accompanying drawings, Figure I is a vertical section. Fig. II is a horizontal section along the line II II of Fig. I, but on a reduced scale. Fig. III is a vertical section on line III III in Fig. II. Fig. IV is a plan view of a clamp. Fig. V is a vertical section, partly broken away, showing means for reheating the end of the gatherer; and Fig. VI is a broken perspective of the lower edge of the gatherer, showing a fluted edge.

The objects of my invention, generally stated, are to, first, maintain a body of plastic glass adjacent to and communicating with its source of supply in a condition suitable to be withdrawn in sheet or hollow form; second, to maintain means whereby the temperature in the body of the plastic glass adjacent to the draw may be lowered from that maintained at its source of supply; third, to provide means for increasing or decreasing the temperature within the body of plastic glass from which the draw is made; fourth, to provide, preferably, portable means for reheating the edge of the gatherer after it has been withdrawn from the receptacle; fifth, to provide means whereby the flow of gaseous fluid is downward in the gatherer, preferably, or may be in the reverse direction, as below described; sixth, the novel supporting means for the inner cooler.

The other features of my invention not above set forth will be apparent from the more detailed description which follows, reference being had to the drawings, which are, however, merely illustrative of the general principles of my invention.

Glass 1 in a liquid or semiliquid condition is contained in a receptacle 2, which receptacle may be of any desired design—as, for instance, it may be part of the general glass pot, tank, or auxiliary thereto or independent thereof—without departing from my invention.

3 represents an outer cooler having an annular chamber 4, inlet-pipe 5, and valve 5'. 6 is a division-wall within said chamber which unites the sides 7 7, top 8, and bottom 9, while 10 represents a second division-wall within said chamber 4, which, however, does not extend to the top 8 of said chamber, but is integral with the sides 7 7 and bottom 9 thereof, thus leaving a space or passage 11 for the passage of the cooling medium.

12 is a port leading from the annular chamber 4 to the second annular chamber 13, situated beneath chamber 4, which second chamber is provided with an outlet 14, which outlet is in turn provided with a suitable valve 15. A series of ports 16 pass transversely through the walls of and through the chamber 13 without, however, communicating therewith. These ports can be of any design or configuration and be located around and through said chamber spirally or in horizontal alinement, or some of them may be placed above the glass-level in the receptacle, or, again, I may extend such auxiliary chamber 13 only part way toward the bottom of the receptacle 2, thus leaving a passage for the molten glass beneath the same without departing from the scope of my invention.

17 represents an inner cooler having an annular chamber 18 and is provided with an inlet-pipe 19, which is in turn fitted with a regulating-valve 20. The chamber 18 has division-walls in the interior thereof similar in construction and extent to those shown in Fig. III and heretofore described in connection with the outer cooler 4. A port 21 leads from the annular chamber 18 to a second annular chamber 22, which is preferably formed by means of the inner and outer pipes 23 and 24 of different diameters, as shown, and secured to projecting flanges 25 and 26 of the inner cooler 17. Said pipes are closed and secured at their lower extremities by means of the T 27 and bush 28, as shown. The lower end of pipe 23 is supported on a suitable base 29, which may in turn be provided with any convenient foundation to enable it to sustain the mechanisms above described as supported thereon. A valve 30 is connected to the T 27, through which the cooling medium contained in the inner cooler 17 escapes.

Between the annular chamber 18 and the projecting flanges 25 and 26 I preferably provide a series of ports 31 31, which pass transversely through the walls of the chamber 18 without, however, communicating with the interior of said chamber. These ports communicate with the annular chamber 32 and with orifice 33. A pipe 34 communicates with said chamber 32 and is provided with a valve 35. Inlet-pipe 36, provided with a valve 37, leads from a source of supply and passes through an opening 38 in the horizontal head or top of the inner cooler 17. A hood 39, preferably provided with a deflecting-flange 40, is supported above said inner cooler. 41 is a gatherer having eyelets 42 or other suitable means for attaching the hoisting mechanism used for raising and lowering the same. The lower edge of the gatherer 41 may be provided with a series of serrations 43 and the shoulders 44 44.

45 represents a clamp preferably composed of two sections hinged together at 46 and capable of being locked together at 47 and having internal peripheral flanges 48 48, which flanges are adapted to engage a circumferential slot 49 in the gatherer 41.

In Fig. V, I show the lower extremity of the gatherer 41 encircled by a hood 50, which, similar to clamp 45, is composed of two sections hinged together and adapted to be locked together at their free ends and supported by hooks 51, only one of which is shown, which hooks may be secured in eyelets 52 of the gatherer 41, or said hood may be attached to said gatherer by any convenient means permitting of its ready adjustment and removal. 53 53 are outlet-ports in said hood to aid combustion. 54 is a gas-burner contained in said hood and made in two sections hinged together by means of a flexible tube and capable of being joined in a similar manner at their free ends, said gas-burner being connected with a flexible inlet supply-pipe 55. Said supply-pipe 55 is so arranged and carried that its outlet into said gas-burner follows the gatherer in its movement without difficulty.

Referring again to the inner cooler 17, I have shown a covering of refractory material 56 surrounding the outer projecting flange of the cooler and also the exposed portion of the outer pipe 24 which is within the chamber 2. I may also provide a covering of similar nature for that portion of the annular chamber 13 which is exposed within the chamber 2 and also a lining of like material for the ports 16 without departing from my invention.

The general operation is as follows: Assuming in Fig. I that the glass 1 contained in chamber 2 is divided, as shown, by the outer wall of the chamber 13 from the glass contained within the compartment 57 and that a cooling fluid is passing through the outer cooler 3, thence into the chamber 13 and out through valve 15 and also a like current through the inner cooler 17, thence through chamber 18 and passing out through valve 30, it is then apparent that by increasing or decreasing the temperature of the fluid circulating through the respective coolers and their connecting-chambers or by varying the rate of flow of the current the temperature of the glass contained within the compartment 57 may be raised or lowered at will without affecting to any appreciable extent the temperature of the glass contained in the major portion of the receptacle 2.

It is essential to the successful drawing of sheet-glass, whether it be in hollow or other form, that the material from which it is drawn be of a consistency approximately resembling the plastic mass used in hand-blowing of cylinders rather than the molten condition to be found within the melting-receptacle. To obtain material in such plastic form, it has heretofore been necessary to gather it from the melting-receptacle, deposit it in an auxiliary holder, allow it therein to cool sufficiently until it reaches the proper plastic condition for drawing, and then make the draw from said holder. To avoid the loss of time and additional labor required in the above transfer of the glass from the main receptacle to said holder and the other steps above set forth, it is necessary to change a portion of the glass contained in the receptacle without removal therefrom from a molten to the plastic state similar to that used in the hand-blowing method.

I claim as novel the use of both the inner and outer secondary cooling-chambers in combination or one of the same alone.

When the operator has sufficiently hardened the glass within the compartment 57 for the purpose required, the gatherer 41 is lowered within the orifice 33 between the inner side of the outer cooler 3 and the outer side of the inner cooler 17 until the lower edge of said gatherer is immersed in the glass contained in the compartment 57. After remaining a sufficient length of time or until the glass adheres thereto sufficiently the gatherer is now raised at the speed best suited to cause the adhering glass to be raised therewith of a uniform thickness. A gaseous fluid under pressure during the upward movement of the gatherer passes from pipe 36 and fills the interior of the gatherer and the adhering wall of glass, the surplus passing downwardly and out through the ports 31 31 and their connections. The downward passage of the flow from a point approximately from above the inner cooler to a point approximately below the same performs a very important function described below. Heretofore gaseous fluid, such as air, was discharged under pressure above the apex of the draw—that is, at the summit of the annular taper of the plastic glass at the point where it forms into a cylinder—and passed out through an opening in the gatherer, thus forming a circulation approximately throughout the interior of the drawn cylinder saving that portion of the cylinder below the inlet-discharge of the air-supply, which is therefore out of the direct current and subjected to a back pressure or, in other words, a cushioning of the air against the wall of the draw and the top of the glass in the receptacle. As is well known, the heat passing upwardly from the glass contained in the receptacle tends to cause the pressure of the air within the draw to become very irregular, and thus effect an uneven contraction of the diameter of the cylinder at the apex of the draw—a point where it is essential for the pressure to be steady and uniform. Moreover, the passage of the current of air upward through the gatherer causes the temperature to be lowered at a greater rate than otherwise would be the case if there were no escape for the air through an exit in the gatherer. I obtain the opposite result—that is, the cushioning takes place in the space above the coolers—while the temperature and pressure are more nearly uniform at the apex of the draw. When the gatherer has been sufficiently raised to clear the outer cooler 3, I preferably attach clamp 45, as shown in Fig. IV, which clamp has been previously heated, or I may provide a device similar to that shown in Fig. V, the purpose of both of which devices is to reinforce or maintain the heat of the edge of the gatherer for the following reasons: When the gatherer is raised from between the two coolers as in the present application or as before described as taking place in prior devices, after the gatherer's initial start a circulation of air is passed through the cylinder of glass and the gatherer the gatherer begins to cool off and contract, thereby frequently causing the adhering glass to crack and break off from the gatherer and fall back into the receptacle, thus destroying the draw. The importance, therefore, of maintaining or increasing the heat of the edge of the gatherer is evident. Hence I preferably attach a suitable device to the gatherer, as described, to maintain or reinforce the heat, thus preventing a too rapid contraction of the edge of the gatherer and to enable the glass adhering to the edge of the gatherer to remain intact. After the gatherer 41 and the pendent glass have been drawn upwardly the predetermined distance the glass cylinder is ready to be disconnected from the glass contained in the receptacle.

While I have described the gaseous fluid as entering pipe 36 and discharging within the interior of the draw and the excess passing out through ports 31 31, still I would gain better results than have been hitherto obtained if I reverse the order and permit the flow of gaseous fluid to be upward through pipe 34, chamber 32, and ports 31 31, then within the draw of glass. In such case the excess fluid would pass out under the hood 39 and down through pipe 36, inasmuch as the fluid contained above the hood would be cushioned practically without current and tends to prevent the too rapid cooling of the gatherer.

The difficulty of preventing the glass from becoming dislodged from the gatherer, as before described, is also lessened by the use of a gatherer with a serrated or fluted edge, as shown in Fig. VI. The serrations permit the filling of the interstices with glass, and the inner and outer circumferential shoulders 44 44 afford an additional adhering surface, thus enabling the gatherer to obtain a firmer hold on the adhering glass.

Being fully aware of the importance of my invention generally, I have attempted to sufficiently explain the equivalents which might be suggested from a perusal of the accompanying description and drawings; but, however, such modifications as may suggest themselves to those skilled in this art I believe are fully covered in the accompanying claims, and

What I claim is—

1. In the manufacture of glass, a receptacle from which glass is adapted to be drawn in hollow or sheet form, a cooler adjacent to the draw having a chamber therein, a secondary chamber adjacent to said cooler and means for communicating between said chambers.

2. In the manufacture of glass, a receptacle from which glass is adapted to be drawn in hollow or sheet form, a cooler adjacent to the draw, a chamber in said cooler, an inlet to said chamber, a second chamber adjacent to said first chamber, means for communicating between said chambers and an outlet-passage from said second chamber.

3. In the manufacture of glass, a receptacle from which glass is adapted to be drawn in hollow form, a cooler within the draw, a cooling-chamber adjacent to said cooler and means for communicating between said chamber and said cooler.

4. In the manufacture of glass, a receptacle from which glass is adapted to be withdrawn in hollow form, a cooler within the draw, a cooling-chamber adjacent to said cooler, means for communicating between said cooler and chamber, an inlet to said cooler and an outlet from said chamber for the admission and discharge of a fluid.

5. In the manufacture of glass, a receptacle from which glass is adapted to be drawn in hollow form, a cooler adjacent to the outer wall of the draw, a chamber adjacent to said cooler and within said receptacle, a second cooler within the draw and a second chamber adjacent to said second cooler.

6. In the manufacture of glass, a receptacle from which glass is adapted to be drawn in hollow form, a cooler adjacent to the outer wall of the draw, a chamber adjacent to said cooler and within said receptacle, a second cooler within the draw, a second chamber adjacent to said second cooler and means for circulating a fluid through said coolers and said chambers.

7. In the manufacture of glass, a cooler, a chamber therein having its inlet-discharge adjacent to the bottom of said chamber, a division-wall integral with the sides, top and bottom of said chamber, a second division-wall integral with the sides and bottom of said chamber, a passage above said second division-wall and an outlet-port between said division-walls.

8. In the manufacture of glass, a cooler, a chamber therein having its inlet-discharge adjacent to the bottom of said chamber, a division-wall integral with the sides, top and bottom of said chamber, a second division-wall adjacent to said first division-wall and integral with the sides and bottom of said chamber, a passage above said second division-wall and an outlet-port between said division-walls.

9. In the manufacture of glass, a receptacle from which glass is adapted to be drawn and means for maintaining a downward circulation of gaseous fluid adjacent to the apex of said draw.

10. In the manufacture of glass, a receptacle from which glass is adapted to be drawn, an inlet within the draw and adjacent to the top of said receptacle and an outlet adjacent to the apex of the draw, for a downward circulation of a gaseous fluid.

11. In the manufacture of glass, a receptacle from which glass is adapted to be drawn, a cooler adjacent to the draw and means for maintaining a downward circulation of gaseous fluid adjacent to the apex of said draw.

12. In the manufacture of glass, a receptacle from which glass is adapted to be drawn, a cooler adjacent to the draw and means for maintaining a downward circulation of gaseous fluid between the wall of the draw and said cooler.

13. In the manufacture of glass, a receptacle from which glass is adapted to be drawn, a cooler adjacent to the draw, a hood adjacent to said cooler and an opening extending through the sides of said cooler adapted to form a passage for the exit of a gaseous fluid from under said hood.

14. In the manufacture of glass, a cooler having a chamber adapted to contain a fluid to reduce the temperature of the wall of a draw of glass by radiation and means for producing a downward flow of a gaseous fluid adjacent to the face of said chamber.

15. In the manufacture of glass by drawing from a receptacle in hollow form, means for maintaining a pressure and a downward circulation of gaseous fluid within the draw whereby the exit for the gaseous fluid is adjacent the apex of the draw.

16. In the manufacture of glass, a receptacle from which glass is adapted to be drawn, an opening adjacent to the top of said receptacle and an opening adjacent to the apex of the draw for the circulation of a gaseous fluid.

17. In the manufacture of glass, a receptacle from which glass is adapted to be drawn, a cooler within the draw, an opening adjacent to the top of said cooler and an opening adjacent to the bottom of said cooler for the circulation of a gaseous fluid.

Signed at Pittsburg, Pennsylvania, this 22d day of December, 1903.

GEORGE H. HARVEY.

Witnesses:
J. H. HARRISON,
R. B. WAKEFIELD